United States Patent
Chen et al.

(10) Patent No.: US 8,493,347 B2
(45) Date of Patent: Jul. 23, 2013

(54) TOUCH DISPLAY PANEL

(75) Inventors: Cheng-An Chen, Taipei (TW);
Wei-Hung Kuo, Changhua County (TW); Tun-Chun Yang, Taipei (TW); Seok-Lyul Lee, Hsinchu (TW); Wei-Ming Huang, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 629 days.

(21) Appl. No.: 12/770,746

(22) Filed: Apr. 30, 2010

(65) Prior Publication Data

US 2011/0148781 A1 Jun. 23, 2011

(30) Foreign Application Priority Data

Dec. 22, 2009 (TW) .............................. 98144304 A

(51) Int. Cl.
*G06F 3/041* (2006.01)
(52) U.S. Cl.
USPC .......................................... 345/173; 345/156
(58) Field of Classification Search
USPC .................................................. 345/156–173
See application file for complete search history.

(56) References Cited

U.S. PATENT DOCUMENTS

| | | | |
|---|---|---|---|
| 2005/0200296 A1* | 9/2005 | Naugler et al. | 315/150 |
| 2007/0236618 A1* | 10/2007 | Maag et al. | 349/12 |
| 2008/0211395 A1* | 9/2008 | Koshihara et al. | 313/504 |
| 2009/0002337 A1* | 1/2009 | Chang | 345/174 |
| 2009/0218310 A1* | 9/2009 | Zu et al. | 216/11 |
| 2009/0219257 A1* | 9/2009 | Frey et al. | 345/173 |
| 2009/0290105 A1* | 11/2009 | Takada | 349/96 |
| 2009/0309850 A1* | 12/2009 | Yang | 345/174 |
| 2010/0066650 A1* | 3/2010 | Lee et al. | 345/64 |
| 2010/0079393 A1* | 4/2010 | Dews | 345/173 |

FOREIGN PATENT DOCUMENTS

TW  200944884  11/2009

OTHER PUBLICATIONS

"Office Action of Taiwan Counterpart Application", issued on May 17, 2013, p. 1-p. 6, in which the listed reference was cited.

\* cited by examiner

*Primary Examiner* — Viet Pham
(74) *Attorney, Agent, or Firm* — Jianq Chyun IP Office

(57) ABSTRACT

A touch display panel including a first substrate, a second substrate, a light shielding pattern layer, a touch sensing layer and a display medium is provided. The light shielding pattern layer is disposed on the first substrate or the second substrate. Pixel units are defined by the light shielding pattern layer, each pixel unit has a pixel edge length, and each pixel unit is disposed corresponding to one of the pixel structures. The touch sensing layer is disposed on the second substrate and has a plurality of first touch series and a plurality of second touch series. Each first touch series and each touch series respectively have mesh touch pads serially connected to each other. Each mesh touch pad has a plurality of grid patterns, each grid pattern has a grid edge length, and the grid edge length is ⅛~⅗ of the pixel edge length.

9 Claims, 16 Drawing Sheets

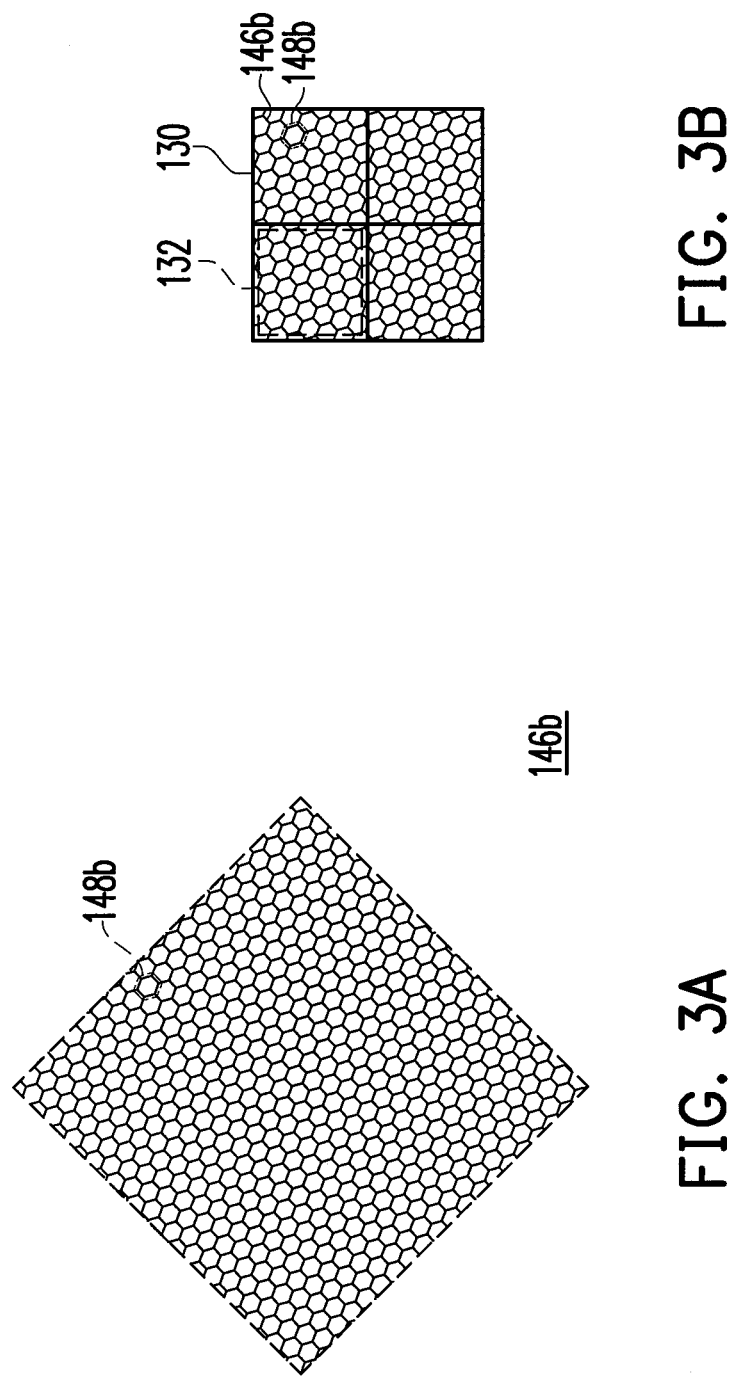

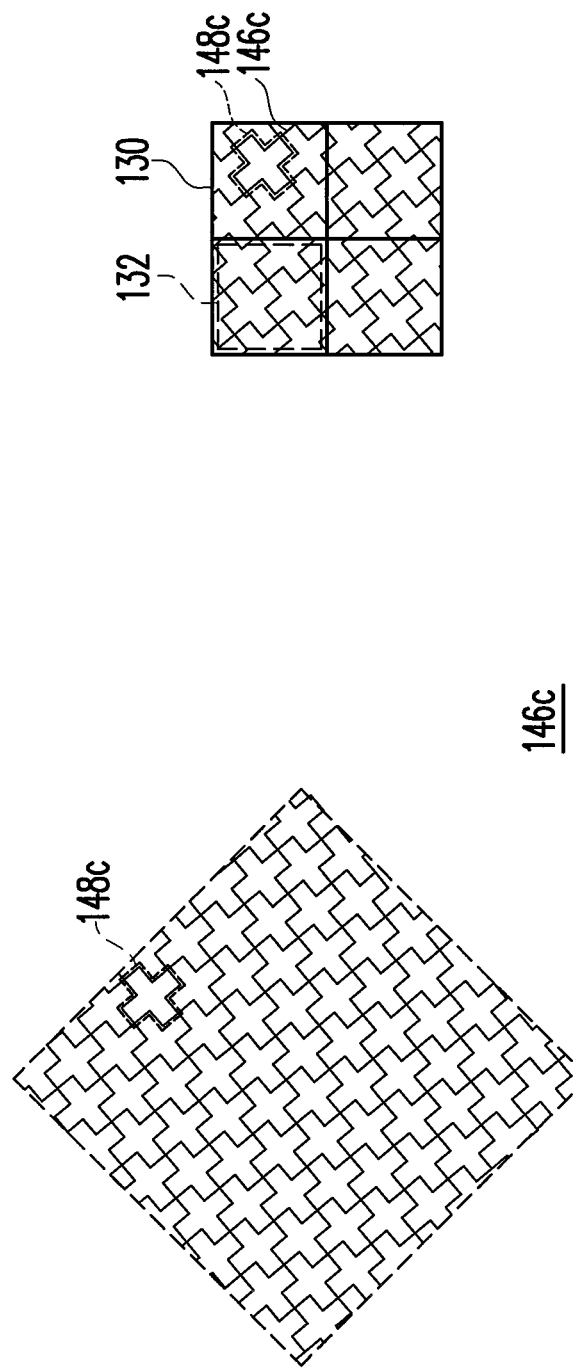

TOUCH DISPLAY PANEL

CROSS-REFERENCE TO RELATED APPLICATION

This application claims the priority benefit of Taiwan application serial no. 98144304, filed on Dec. 22, 2009. The entirety the above-mentioned patent application is hereby incorporated by reference herein and made a part of specification.

BACKGROUND OF THE INVENTION

1. Field of the Invention

The present invention relates to a display panel, and particularly relates to a touch display panel.

2. Description of Related Art

In current information era, human beings by degrees tend to rely on electronic products. The electronic products such as mobile phones, handheld personal computers (PCs), personal digital assistants (PDAs) and smart phones have pervaded everywhere in our daily life. To meet current demands on portable, compact, and user-friendly information technology (IT) products, touch panels have been introduced as input devices in replacement of conventional keyboards or mice. Among the touch panels, a touch display panel capable of performing both a touch function and a display function is one of the most popular products at present.

Generally speaking, a touch display panel comprises a display panel and a touch panel, wherein the touch panel can be built in the display panel or attached on the display panel. The touch panel usually includes a plurality of first touch series extending along X direction and a plurality of second touch series extending along Y direction, and each first touch series and each second touch series respectively have a plurality touch pads serially connected to each other. When a finger touches the touch panel, the capacitance between the touch pads is changed, and then a changed signal is transmitted to a controller so as to compute a touch coordinate. Hence, a display image on the display panel can be changed according to the selection touched by the user.

In a conventional touch panel, in order to make the touch panel having high transmittance, a transparent conductive material is used to form the touch pads. However, the transparent conductive material has disadvantages of high resistance and high cost.

SUMMARY OF THE INVENTION

The invention provides a touch display panel which has good visual effect and excellent touch sensitivity.

The invention provides a touch display panel including a first substrate, a second substrate, a light shielding pattern layer, a touch sensing layer, and a display medium. The first substrate has a plurality of pixel structures disposed thereon. The second substrate is disposed opposite to the first substrate. The light shielding pattern layer is disposed on the first substrate or the second substrate. A plurality of pixel units are defined by the light shielding pattern layer, each pixel unit has a pixel edge length, and each pixel unit is disposed corresponding to one of the pixel structures on the first substrate. The touch sensing layer is disposed on the second substrate and comprises a plurality of first touch series and a plurality of second touch series. Each first touch series and each touch series respectively have a plurality of mesh touch pads serially connected to each other and each mesh touch pad has a plurality of grid patterns, wherein each grid pattern has a grid edge length and the grid edge length is $1/8 \sim 3/5$ of the pixel edge length. The display medium is sandwiched between the first substrate and the second substrate.

According to an embodiment of the present invention, the grid patterns have a line width in a range of $0.1 \sim 10$ μm.

According to an embodiment of the present invention, the grid patterns are respectively a quadrangle, and an angle between a bottom edge of the quadrangle and a pixel edge of the pixel unit is $0°$.

According to an embodiment of the present invention, the pixel edge length is 200 μm, and the gird edge length of the quadrangle-shaped grid pattern is $5 \sim 25$ μm.

According to an embodiment of the present invention, the grid patterns are respectively diamond-shaped, and an angle between a bottom edge of the diamond-shaped grid pattern and a pixel edge of the pixel unit is $25 \sim 65°$.

According to an embodiment of the present invention, the pixel edge length is 200 μm, and the grid edge length of the diamond-shaped grid pattern is $5 \sim 120$ μm.

According to an embodiment of the present invention, the grid patterns are respectively hexagon-shaped, and an angle between a bottom edge of the hexagon-shaped grid pattern and a pixel edge of the pixel unit is $10 \sim 45°$.

According to an embodiment of the present invention, the pixel edge length is 200 μm, and the grid edge length of the hexagon-shaped grid pattern is $5 \sim 33$ μm.

According to an embodiment of the present invention, the grid patterns are respectively cross-shaped, and an angle between a bottom edge of the cross-shaped grid pattern and a pixel edge of the pixel unit is $25 \sim 65°$.

According to an embodiment of the present invention, the pixel edge length is 200 μm, and the grid edge length of the cross-shaped grid pattern is 550 μm.

According to an embodiment of the present invention, the grid patterns are respectively twisting-cross-shaped, each twisting-cross-shaped grid pattern comprises four large quadrangles and one small quadrangle disposed in the center of the four large quadrangles, an angle between a bottom edge of each large quadrangle and a pixel edge of the pixel unit is $25 \sim 65°$, and an angle between a bottom edge of the small quadrangle and the pixel edge of the pixel unit is $25 \sim 65°$.

According to an embodiment of the present invention, the pixel edge length is 200 μm, the grid edge length of the large quadrangle is 550 μm, and a total grid edge length of each twisting-cross-shaped grid pattern is not more than 135 μm.

According to an embodiment of the present invention, the touch sensing layer is disposed between the second substrate and the light shielding pattern layer.

According to an embodiment of the present invention, the touch sensing layer is disposed on an outer surface of the second substrate.

According to an embodiment of the present invention, the touch display panel further comprises an auxiliary substrate disposed on an outer surface of the second substrate, and the touch sensing layer is disposed on the auxiliary substrate.

According to an embodiment of the present invention, a material of the light shielding pattern layer comprises black resins.

According to an embodiment of the present invention, a material of the touch sensing layer comprises a metal.

According to an embodiment of the present invention, a material of the touch sensing layer comprises aluminum, copper, molybdenum, titanium, silver, gold, platinum or an alloy thereof.

According to the aforementioned, in the touch display panel of the present invention, each mesh touch pad is formed by the grid patterns having a specific shape and a specific grid edge length, and a specific angle is between the bottom edge of the grid pattern and the pixel edge of the pixel unit. Therefore, the interference between the light shielding pattern layer and the mesh touch pads is minimized, so as to avoid the problems of Moire effect and showing visual grid patterns. And thus, the touch display panel has better visual effect.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

FIG. 3A is a schematic top view of a mesh touch pad of a touch display panel according to a third embodiment of the present invention.

FIG. 3B is a schematic drawing showing the relation between the mesh touch pad and the light shielding pattern layer.

FIG. 4A is a schematic top view of a mesh touch pad of a touch display panel according to a fourth embodiment of the present invention.

FIG. 4B is a schematic drawing showing the relation between the mesh touch pad and the light shielding pattern layer.

DESCRIPTION OF EMBODIMENTS

In order to resolve the transparent conductive material having disadvantages of high resistance and high cost, a mesh metal structure is used to form touch pads in the present invention. In particular, since the mesh metal structure is formed by fine metal lines, the touch pads not only have high transmittance but also have lower resistance and better sensitivity.

However, because the color filter substrate of the display panel has a black matrix arranged periodically therein, the period arrangement of the mesh touch pad and the period arrangement of the black matrix may interfere with each other to form visual Moire effect. In addition, the above mentioned interference may enable the mesh touch pads being a visual structure, such that the touch pads formed by mesh structures are observed by human eyes. As a result, an indistinct image may be displayed on the touch display panel and the visual effect is not good. Therefore, a touch pad having a specific design is provided in the present invention to resolve the above-mentioned Moire effect.

First Embodiment

Figure 1A:
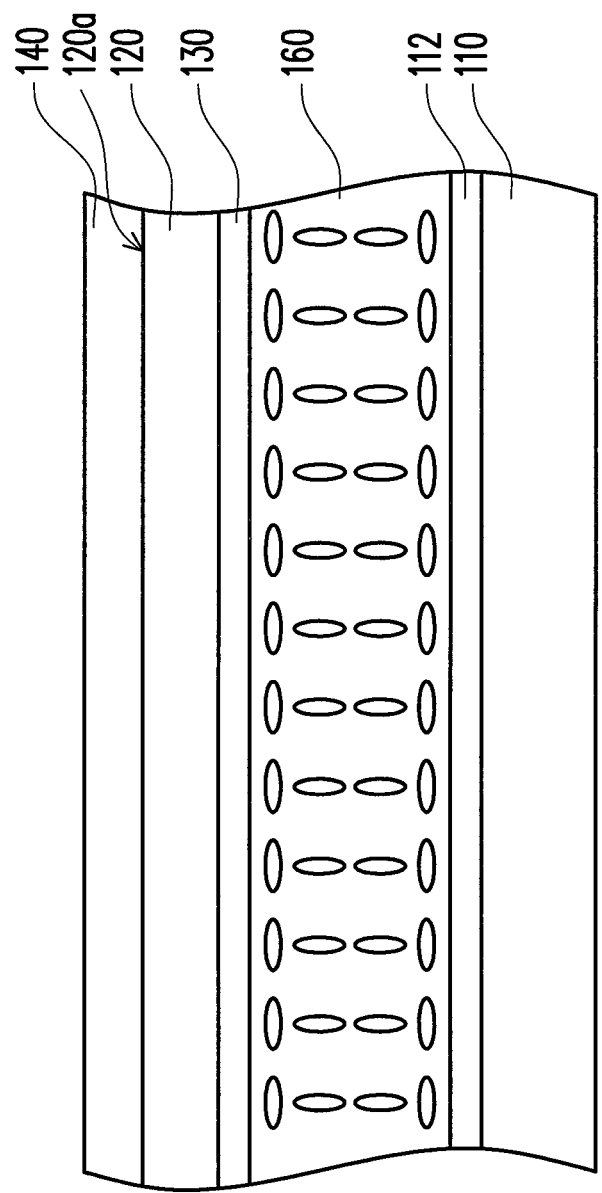
FIG. 1A is a schematic cross-sectional view of a touch display panel according to a first embodiment of the present invention.
Figure 1B:
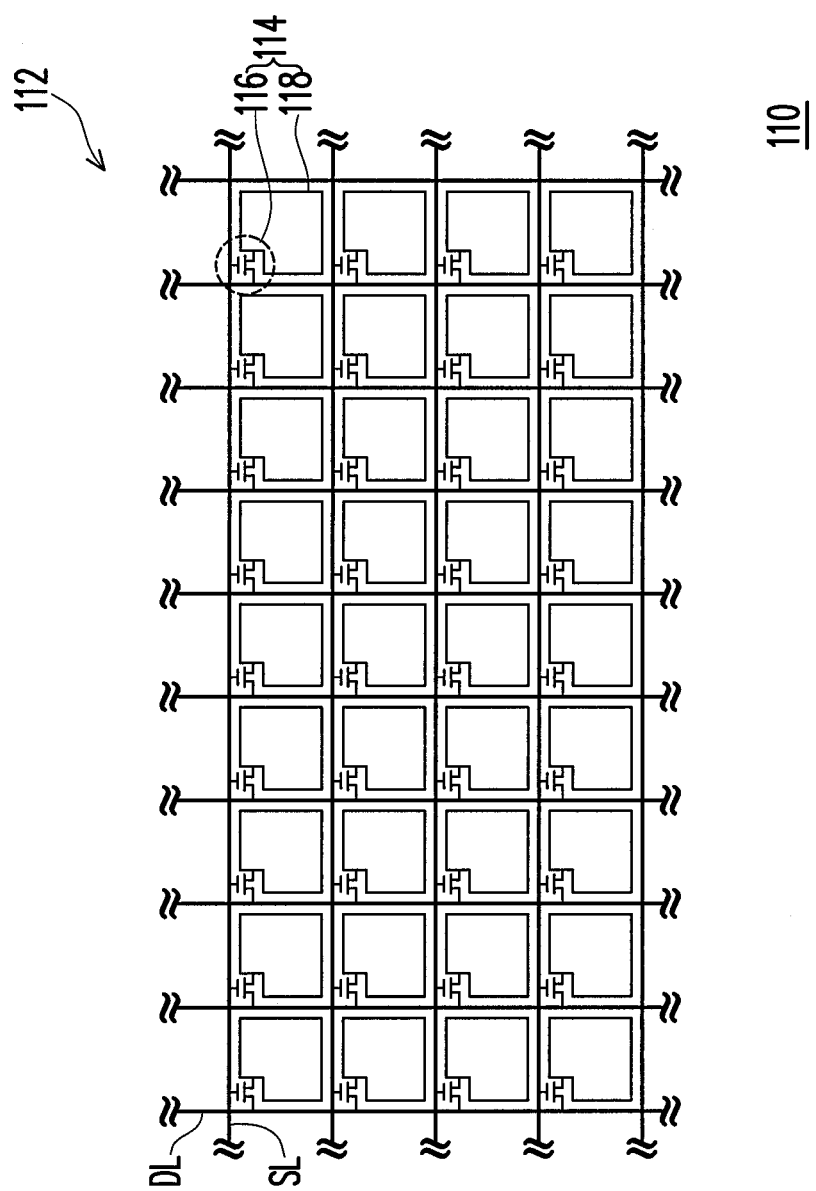
FIG. 1B is a schematic top view of the first substrate depicted in FIG. 1A.
Figure 1C:
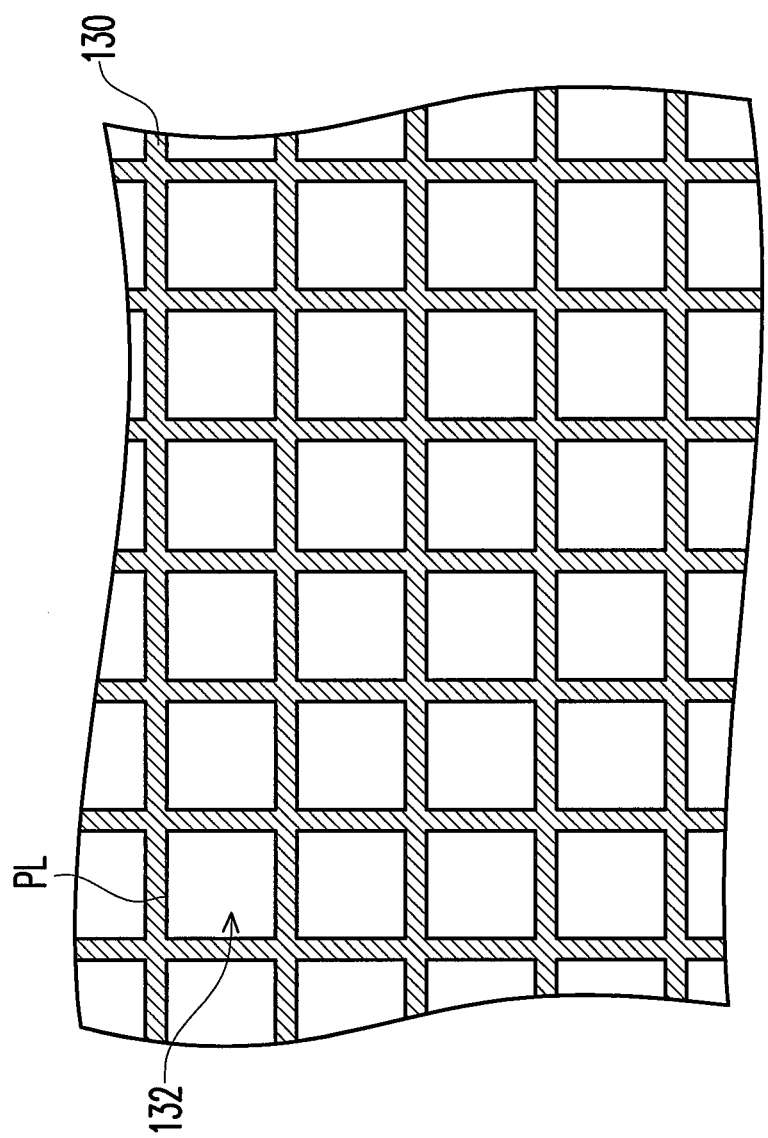
FIG. 1C is a schematic top view of the light shielding pattern layer depicted in FIG. 1A.
Figure 1D:
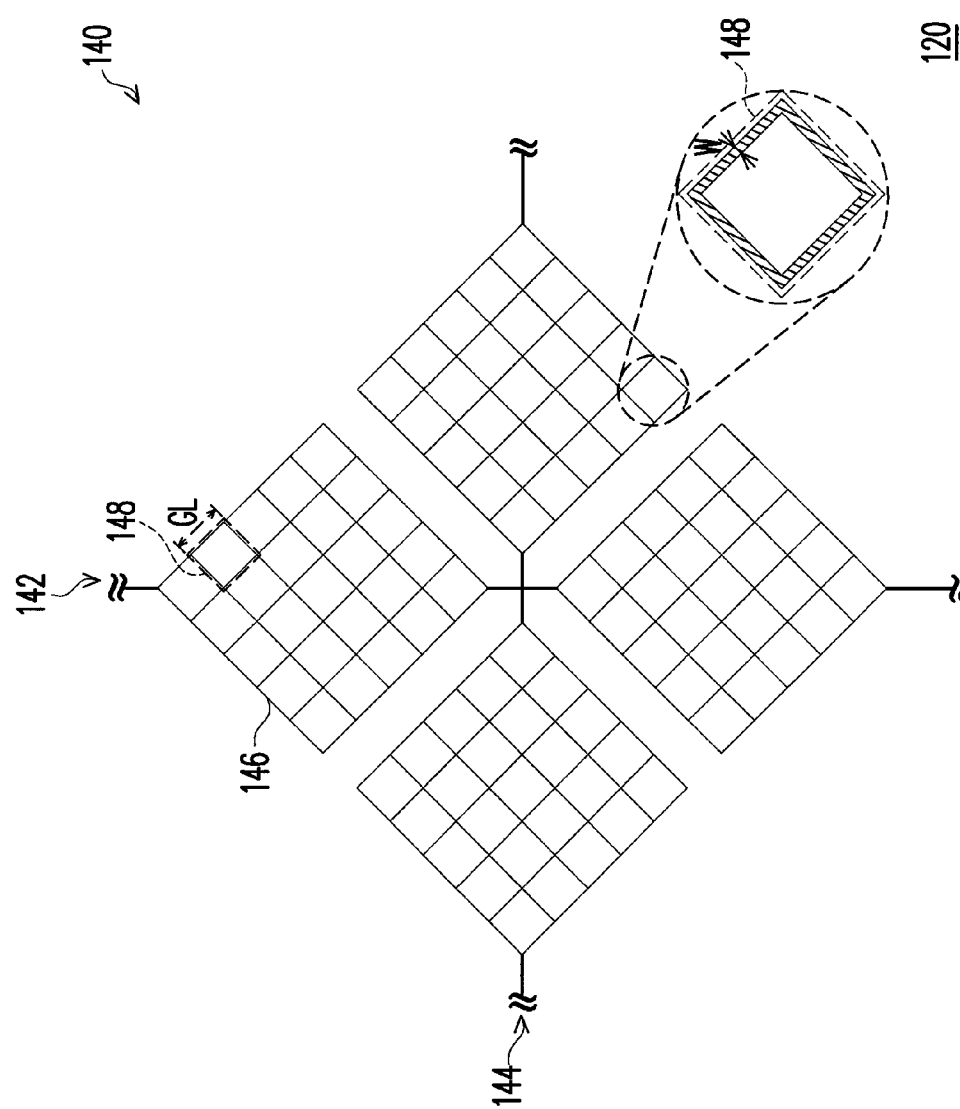
FIG. 1D is a schematic top view of the touch sensing layer depicted in FIG. 1A.
Figure 1F:
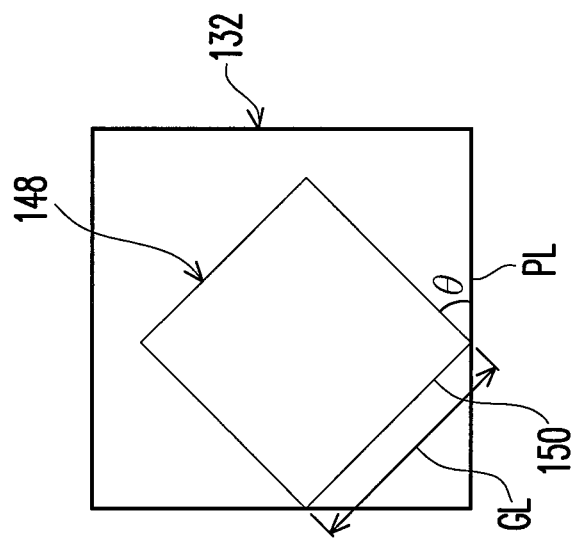
FIG. 1F is a schematic drawing showing the relation between the grid pattern and the pixel unit depicted in FIG. 1E.
Figure 1E:
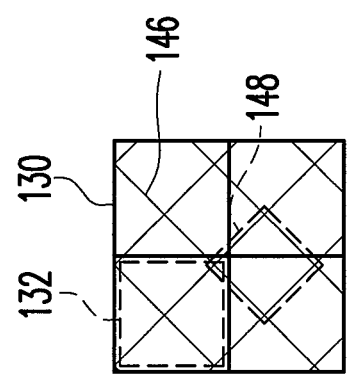
FIG. 1E is a schematic drawing showing the relation between the mesh touch pad and the light shielding pattern layer.

FIG. 1A is a schematic cross-sectional view of a touch display panel according to a first embodiment of the present invention, FIG. 1B is a schematic top view of the first substrate 110 depicted in FIG. 1A, FIG. 1C is a schematic top view of the light shielding pattern layer 130 depicted in FIG. 1A, FIG. 1D is a schematic top view of the touch sensing layer 140 depicted in FIG. 1A, FIG. 1E is a schematic drawing showing the relation between the mesh touch pad 146 and the light shielding pattern layer 130, and FIG. 1F is a schematic drawing showing the relation between the grid pattern 148 and the pixel unit 132 depicted in FIG. 1E.

Referring to FIG. 1A, a touch display panel 100 includes a first substrate 110, a second substrate 120, a light shielding pattern layer 130, a touch sensing layer 140, and a display medium 160. The second substrate 120 is disposed opposite to the first substrate 110. The display medium 160 is sandwiched between the first substrate 110 and the second substrate 120. In the present embodiment, the substrate 110 may be, for example, a glass substrate, a plastic substrate, or other suitable substrates. The display medium 160 comprises a liquid crystal material. Briefly, the touch display panel 100 is a touch liquid crystal display panel in this embodiment. The display medium 160 may also be other display materials, such as an organic light emitting material, an electrophoretic display material or a plasma display material. That is to say, the touch display panel 100 may be a touch organic electroluminescent display panel, a touch electrophoretic display panel, or a touch plasma display panel. The detailed display material compositions and the display panel structures are well known, and thus no further descriptions are provided herein.

Referring to FIG. 1A and FIG. 1B, the first substrate 110 has an active layer 112 thereon, and the active layer 112 comprises a plurality of pixel structures 114. Generally speaking, each pixel structure 114 comprises an active device 116 and a pixel electrode 118 electrically connected to the active device 116. The active device 116 is, for example, a thin film transistor, and each pixel structure 114 is electrically connected to a corresponding scan line SL and a corresponding data line DL through the active device 116. The structure 114 is well known to the one skilled in the art, and the detailed description is omitted. Moreover, the pixel structure 114 shown in FIG. 1B is a schematic top view, and the structure and the arrangement of the pixel structure 114 are not limited herein.

Referring to FIG. 1A and FIG. 1C, in the present embodiment, the light shielding pattern layer 130 is disposed on the second substrate 120, for example. A plurality of pixel units 132 are defined by the light shielding pattern layer 130, each pixel unit 132 has a pixel edge length PL, and each pixel unit 132 is disposed corresponding to one of the pixel structures 114 on the first substrate 110. In other words, the light shielding pattern layer 130 is a periodic structure, and the pitch thereof is the pixel edge length PL. In this embodiment, a material of the light shielding pattern layer 130 comprises a black resin or opaque metal, and thus the light shielding pattern layer 130 is also called a black matrix. The pixel edge length PL of the pixel unit 132 is 200 μm, for example. In the embodiment, a red filter pattern, a blue filter pattern or a green filter pattern is disposed in the pixel unit 132. According to another embodiment, the color filter patterns may also be disposed in other film layers. That means, the pixel units 132 defined by the light shielding pattern layer 132 may also be openings.

Referring to FIG. 1A and FIG. 1D, the touch sensing layer 140 is disposed on an outer surface 120a of the second substrate 120, and the second substrate 120 is between the touch sensing layer 140 and the light shielding pattern layer 130. The touch sensing layer 140 comprises a plurality of first touch series 142 and a plurality of second touch series 144, and each first touch series 142 and each touch series 144 respectively have a plurality of mesh touch pads 146 serially connected to each other. In the embodiment, the first touch series 142 extends along Y direction and is comprised of a plurality of Y mesh touch pads and a plurality of Y bridges serially connected to each other, while the second touch series 144 extends along X direction and is comprised of a plurality of X mesh touch pads and a plurality of X bridges serially connected to each other. The X mesh touch pads and the Y mesh touch pads may be in the same layer, and the X bridges and the Y bridges are electrically isolated from each other by an insulating block therebetween. The X mesh touch pads and the Y mesh touch pads may also be in different layers and are isolated from each other by an insulating layer therebetween. Each mesh touch pad 146 has a plurality of grid patterns 148 therein so as to form a mesh structure in each mesh touch pad 146. Each grid pattern 148 has a grid edge length GL, and the grid edge length GL is ⅛~⅗ of the pixel edge length PL of the pixel unit 132. For example, if the pixel edge length PL is 200 μm, the grid edge length GL is in a range of 25~120 μm. In the embodiment, a material of the touch sensing layer 140 comprises a metal, such as aluminum, copper, molybdenum, titanium, silver, gold, platinum or an alloy thereof. In addition, according to the embodiment, the grid pattern 148 has a line width W between 0.1 μm and 10 μm, and thus the mesh touch pads 146 are substantially formed by fine metal lines so that the mesh touch pads 146 have high transmittance. It is noted that the mesh touch pad 146 is diamond-shaped in the embodiment, while the mesh touch pad 146 may also be rectangle, circle or other shapes in other embodiments. Moreover, the number of the grid patterns 148 for forming the mesh touch pad 146 can also be adjusted based on actual demands, the number of the grid patterns 148 shown in the drawing is only for illustration, and thus it is not represented the actual number of the grid patterns 148 of the mesh touch pad 146.

FIG. 1E is a schematic drawing showing the relation between the mesh touch pad 146 and the light shielding pattern layer 130, and FIG. 1F is a schematic drawing showing the relation between the grid pattern 148 and the pixel unit 132 depicted in FIG. 1E. It is noted that in order to clearly show the relation between the mesh touch pad 146 and the light shielding pattern layer 130, the thick lines represent the light shielding pattern layer 130 of FIG. 1C and only a part of the mesh touch pad 146 and a part of the light shielding pattern layer 130 are shown in FIG. 1E. As shown in FIG. 1F, in order to clearly illustrate the relation between the grid pattern 148 and the pixel unit 132, the grid pattern 148 of FIG. 1E is moved along X direction or Y direction so as to form an angle θ between a bottom edge 150 and the pixel edge PL. It is understood that the angle θ is actually the angle between the bottom edge 150 of the grid pattern 148 and the pixel edge PL of the pixel unit 132.

Referring to FIG. 1E and FIG. 1F, generally speaking, when the light shielding pattern layer 130 and the mesh touch pad 146 are both periodic structures, the two periodic arrangements are interfered with each other to form visual Moire effect, such that the grid patterns 148 of the mesh touch pad 146 may become a visual structure. However, in the present invention, the grid patterns 148 of the mesh touch pad 146 are designed to have a specific shape. That is, the angle θ between the bottom edge 150 of the grid pattern 148 and the pixel edge PL of the pixel unit 132 and the grid edge length GL are obtained from the following equation, such that the interference between the light shielding pattern layer 130 and the mesh touch pad 146 is minimized to avoid the Moire effect. In the following description, the grid pattern 148 is diamond-shaped in the embodiment for illustration and is designed according to the following equation.

$$\sqrt{[f_1-f_2\cos\theta]^2+[f_2\sin\theta]^2}\geq f_{eye}$$

In the above equation, $f_1$ is the spatial frequency of the light shielding pattern layer 130, which is the pixel edge length PL and is 200 μm, for example, and $f_2$ is the spatial frequency of the grid pattern 148, which is the grid edge length GL. The angle θ is an angle between the bottom edge 150 of the grid pattern 148 and the pixel edge PL of the pixel unit 132. $f_{eye}$ is human eye resolution and is about 50 cm/μm. According to the above equation, if the grid pattern 148 is diamond-shaped, the angle θ is 25~65°, and preferably is 45°. $f_2$ is smaller than ⅗ of $f_1$, which is the grid edge length GL is smaller than ⅗ of the pixel edge length PL of the pixel unit 132. If the pixel edge length PL is 200 μm, for example, the grid edge length GL is in a range of 25~120 μm, and preferably is 60 μm. The angle θ between the bottom edge 150 of the grid pattern 148 and the pixel edge PL of the pixel unit 132 and the grid edge length GL of the grid pattern 148 are obtained form the above equation, and thereby the mesh touch pad 146 shown in FIG. 1E is designed, so as to minimize the interference between the light shielding pattern layer 130 and the mesh touch pad 146. It is noted that even though the diamond-shaped grid pattern 148 is described in this embodiment, the above equation can also be applied to grid patterns having other shapes.

In the embodiment, the mesh touch pad is formed by grid patterns, and thereby the mesh touch pad has better transmittance, lower resistance and better sensitivity. In addition, since the grid patterns of the mesh touch pad have a specific shape and a specific grid edge length, and a specific angle is between the bottom edge of the grid pattern and the pixel edge of the pixel unit, the interference between the mesh touch pad and the light shielding pattern layer is minimized, so as to resolve the problems of Moire effect and showing visual grid patterns. Therefore, the touch display panel of the embodiment has better visual effect and good touch sensitivity.

The mesh touch pads formed by other shaped grid patterns are described in the second embodiment to the fifth embodiment as the following description. Because the components of the touch display panels in these embodiments are similar to those in the first embodiment, only the relation between the grid patterns, the mesh touch pads and the light shielding pattern layer and the relation between the grid patterns and the pixel units are described in the second embodiment to the fifth embodiment.

Second Embodiment

Figure 2B:
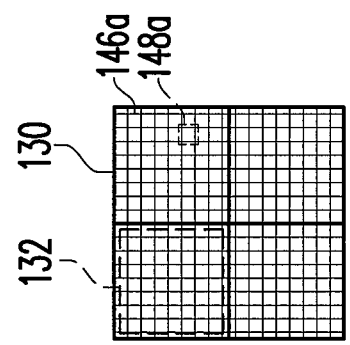
FIG. 2B is a schematic drawing showing the relation between the mesh touch pad and the light shielding pattern layer.
Figure 2A:
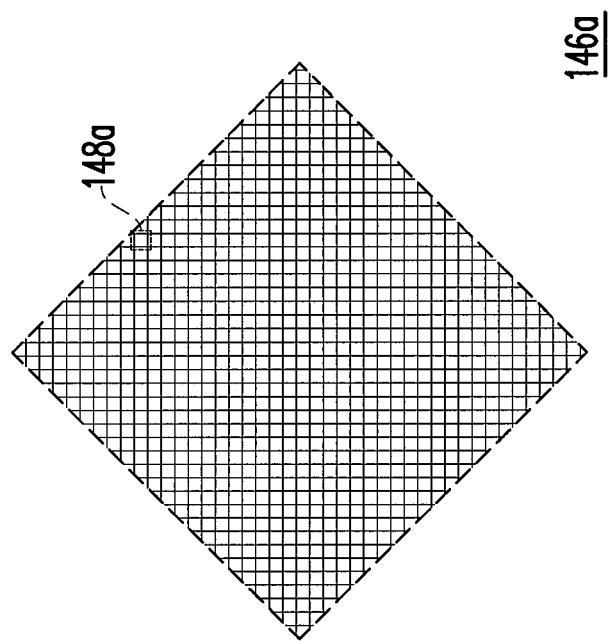
FIG. 2A is a schematic top view of a mesh touch pad of a touch display panel according to a second embodiment of the present invention.
Figure 2C:
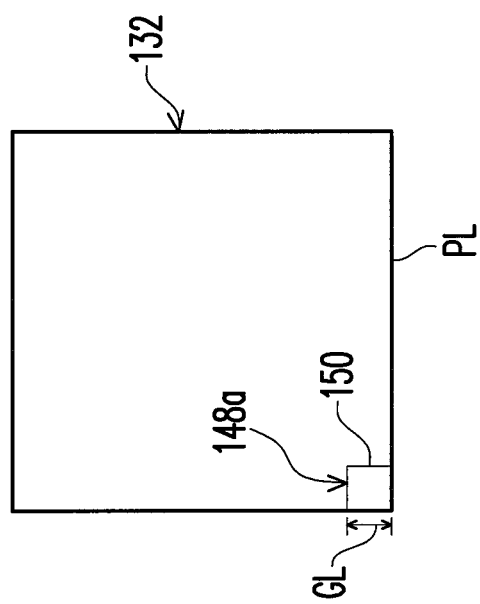
FIG. 2C is a schematic drawing showing the relation between the grid pattern and the pixel unit depicted in FIG. 2B.

FIG. 2A is a schematic top view of a mesh touch pad 146a of a touch display panel according to a second embodiment of the present invention, FIG. 2B is a schematic drawing showing the relation between the mesh touch pad 146a and the light shielding pattern layer 130, and FIG. 2C is a schematic drawing showing the relation between the grid pattern 148a and the pixel unit 132 depicted in FIG. 2B.

Referring to FIG. 2A, FIG. 2B and FIG. 2C, in the embodiment, the grid pattern 148a of the mesh touch pad 146a is quadrangle-shaped, and an angle θ between the bottom edge 150 of the quadrangle-shaped grid pattern 148a and the pixel edge PL of the pixel unit 132 is 0°. More specifically, the grid pattern 148a is square-shaped, for example, and the grid edge length GL is less than ⅛ of the pixel edge length PL of the pixel unit 132. If the pixel edge length PL is 200 μm for example, the grid edge length GL of the quadrangle-shaped grid pattern 148a is 5~25 μm, and preferably is 25 μm.

According to the embodiment, the grid pattern 148a of the mesh touch pad 146a is designed as the structure shown in FIG. 2A and FIG. 2C based on the equation described in the first embodiment, the interference between the mesh touch pad 146a and the light shielding pattern layer 130 is minimized, so as to resolve the problems of Moire effect and showing visual grid patterns. Therefore, the touch display panel of the embodiment has better visual effect and good touch sensitivity.

It is noted that, according to another embodiment (not shown), the grid edge length GL of the quadrangle-shaped grid pattern 148a of the mesh touch pad 146a is equal to the pixel edge length PL of the pixel unit 132, which is the quadrangle-shaped grid pattern 148a completely overlaps with the pixel unit 132, such that the pitch of the mesh touch pad 146a and the pitch of the light shielding patter layer 130 are almost the same. Therefore, the interference is not generated and the Moire effect is minimized or avoided.

Third Embodiment

Figure 3C:
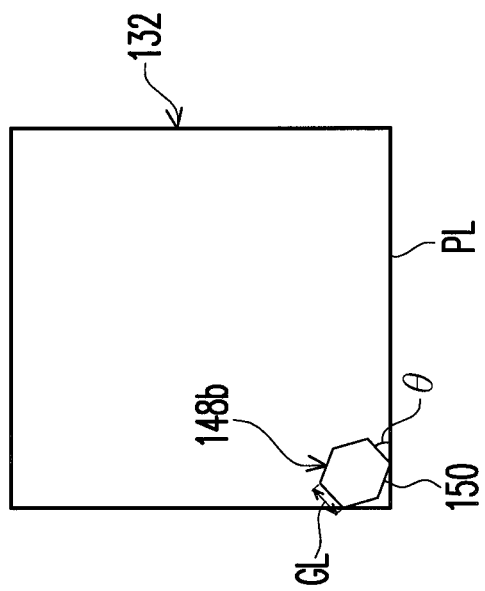
FIG. 3C is a schematic drawing showing the relation between the grid pattern and the pixel unit depicted in FIG. 3B.

FIG. 3A is a schematic top view of a mesh touch pad 146b of a touch display panel according to a third embodiment of the present invention, FIG. 3B is a schematic drawing showing the relation between the mesh touch pad 146b and the light shielding pattern layer 130, and FIG. 3C is a schematic drawing showing the relation between the grid pattern 148b and the pixel unit 132 depicted in FIG. 3B.

Referring to FIG. 3A, FIG. 3B and FIG. 3C, in the embodiment, the grid pattern 148b of the mesh touch pad 146b is hexagon-shaped, and an angle θ between the bottom edge 150 of the hexagon-shaped grid pattern 148b and the pixel edge PL of the pixel unit 132 is 10~45°, and preferably is 45°. More specifically, the grid pattern 148b is hexagon-shaped, for example, and the grid edge length GL is less than ⅙ of the pixel edge length PL of the pixel unit 132. If the pixel edge length PL is 200 μm for example, the grid edge length GL of the hexagon-shaped grid pattern 148b is 5~33 μm, and preferably is 30 μm.

According to the embodiment, the grid pattern 148b of the mesh touch pad 146b is designed as the structure shown in FIG. 3A and FIG. 3B based on the equation described in the first embodiment, the interference between the mesh touch pad 146b and the light shielding pattern layer 130 is minimized, so as to resolve the problems of Moire effect and showing visual grid patterns. Therefore, the touch display panel of the embodiment has better visual effect and good touch sensitivity.

The Fourth Embodiment

Figure 4C:
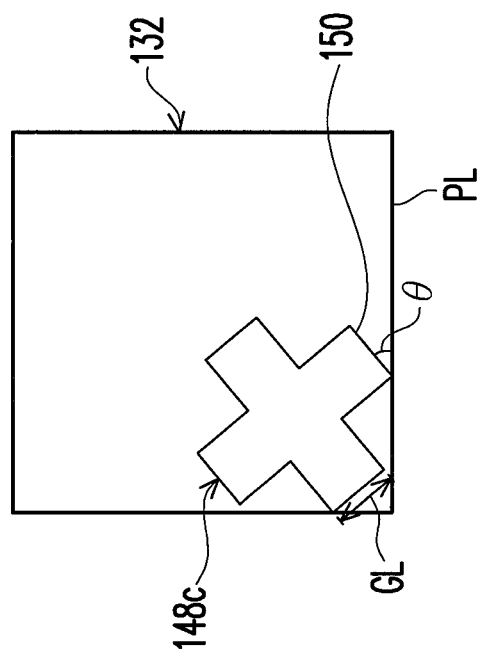
FIG. 4C is a schematic drawing showing the relation between the grid pattern and the pixel unit depicted in FIG. 4B.

FIG. 4A is a schematic top view of a mesh touch pad 146c of a touch display panel according to a fourth embodiment of the present invention, FIG. 4B is a schematic drawing showing the relation between the mesh touch pad 146c and the light shielding pattern layer 130, and FIG. 4C is a schematic drawing showing the relation between the grid pattern 148c and the pixel unit 132 depicted in FIG. 4B.

Referring to FIG. 4A, FIG. 4B and FIG. 4C, in the embodiment, the grid pattern 148c of the mesh touch pad 146c is cross-shaped, and an angle θ between the bottom edge 150 of the cross-shaped grid pattern 148c and the pixel edge PL of the pixel unit 132 is 25~65°, and preferably is 45°. More specifically, the grid edge length GL is less than ¼ of the pixel edge length PL of the pixel unit 132. If the pixel edge length PL is 200 μm, for example, the grid edge length GL of the cross-shaped grid pattern 148c is 5~50 μm, and preferably is 45 μm.

According to the embodiment, the grid pattern 148c of the mesh touch pad 146c is designed as the structure shown in FIG. 4A and FIG. 4B based on the equation described in the first embodiment, the interference between the mesh touch pad 146c and the light shielding pattern layer 130 is minimized, so as to resolve the problems of Moire effect and showing visual grid patterns. Therefore, the touch display panel of the embodiment has better visual effect and good touch sensitivity.

The Fifth Embodiment

Figure 5B:
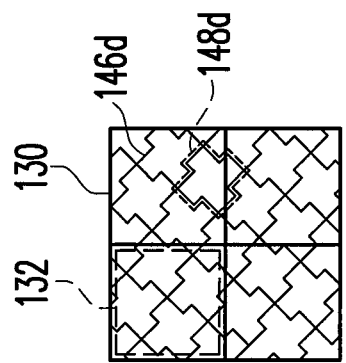
FIG. 5B is a schematic drawing showing the relation between the mesh touch pad and the light shielding pattern layer.
Figure 5A:
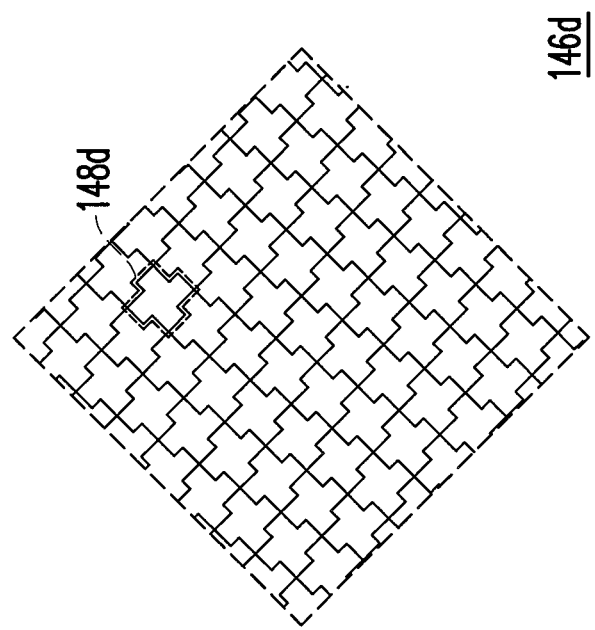
FIG. 5A is a schematic top view of a mesh touch pad of a touch display panel according to a fifth embodiment of the present invention.
Figure 5C:
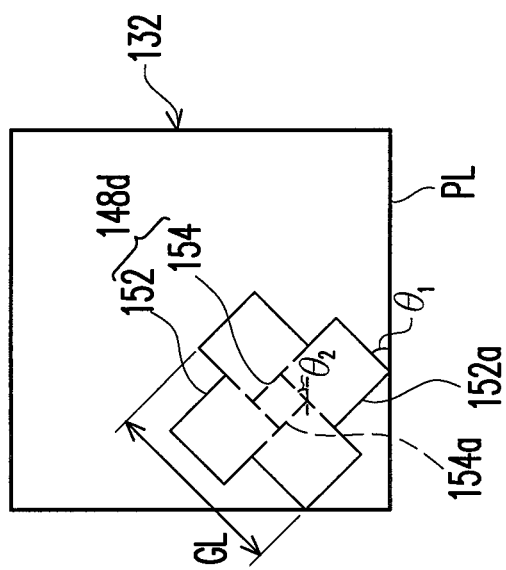
FIG. 5C is a schematic drawing showing the relation between the grid pattern and the pixel unit depicted in FIG. 5B.

FIG. 5A is a schematic top view of a mesh touch pad 146d of a touch display panel according to a fifth embodiment of the present invention, FIG. 5B is a schematic drawing showing the relation between the mesh touch pad 146d and the light shielding pattern layer 130, and FIG. 5C is a schematic drawing showing the relation between the grid pattern 148d and the pixel unit 132 depicted in FIG. 5B.

Referring to FIG. 5A, FIG. 5B and FIG. 5C, the grid pattern 148d of the mesh touch pad 146d is twisting-cross-shaped, the twisting-cross-shaped grid pattern 148d comprises four large quadrangles 152 and one small quadrangle 154 disposed in the center of the four large quadrangles 152, an angle $\theta_1$ between a bottom edge 152a of the large quadrangle 152 and the pixel edge PL of the pixel unit 132 is 25~65°, preferably is 45°, and an angle $\theta_2$ between a bottom edge 154a of the small quadrangle 154 and the pixel edge PL of the pixel unit 132 is 25~65°, and preferably is 45°. More specifically, the large quadrangle 152 has an edge length preferably smaller than ¼ of the pixel edge length PL, and the sum of twice of the edge length of the large quadrangle 152 and the edge length of the small quadrangle 154 is not more than 135 μm. That is, a total grid edge length GL of the twisting-cross-shaped grid pattern 148d is not more than 135 μm. For example, if the pixel edge length PL is 200 μm, the edge length of the large quadrangle 152 is 550 μm, and preferably is 45 μm.

In the embodiment, the twisting-cross-shaped grid pattern 148d may minimize the interference between the mesh touch pad 146d and the light shielding pattern layer 130, so as to resolve the problems of Moire effect and showing visual grid patterns. Moreover, the twisting-cross-shaped grid pattern 148d has better transmittance than that of the cross-shaped grid pattern 148c of FIG. 4A. Therefore, the touch display panel of the embodiment has better visual effect, good transmittance and good touch sensitivity.

It is noted that, in addition to the grid patterns described in the above-mentioned embodiments, the grid pattern may also be polygon-shaped or has other shapes. Even though the grid patterns in the above-mentioned embodiments are arranged periodically, the grid patterns may also be arranged as non-periodical arrangements according to another embodiment.

Figure 6:
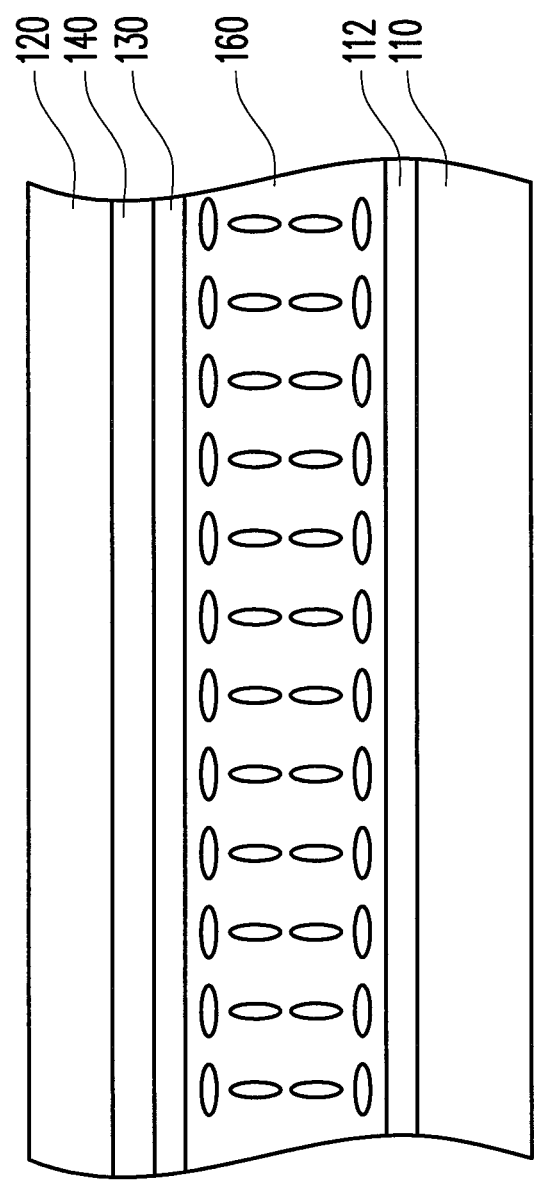
FIG. 6 is a schematic cross-sectional view of a touch display panel according to another embodiment of the present invention.
Figure 7:
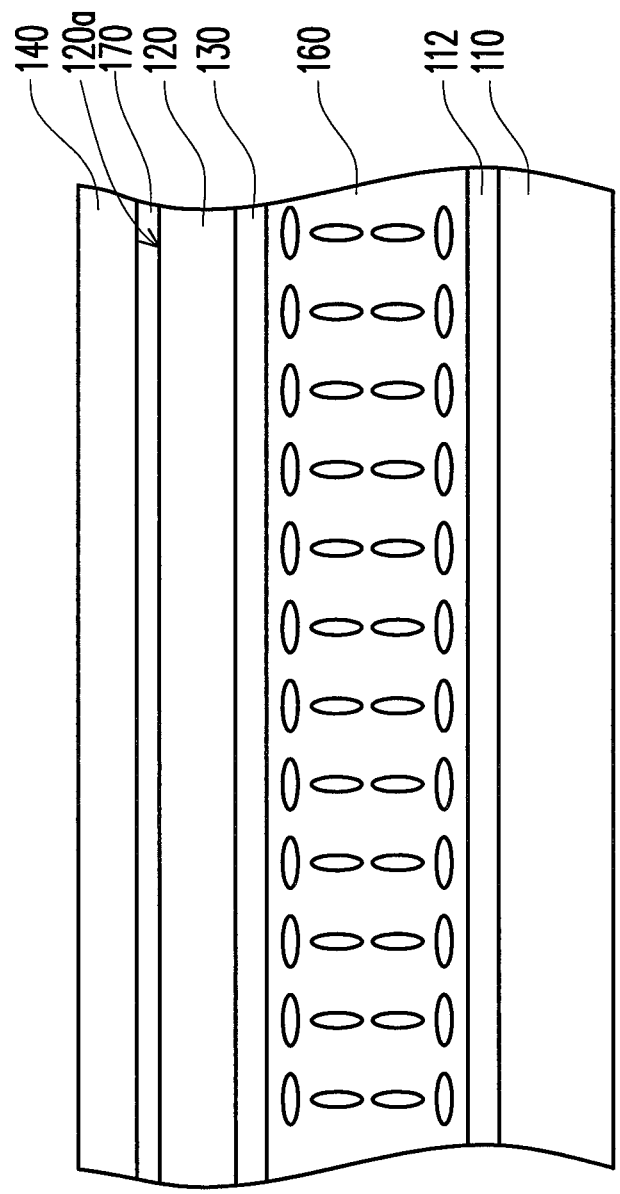
FIG. 7 is a schematic cross-sectional view of a touch display panel according to another embodiment of the present invention.
Figure 8:
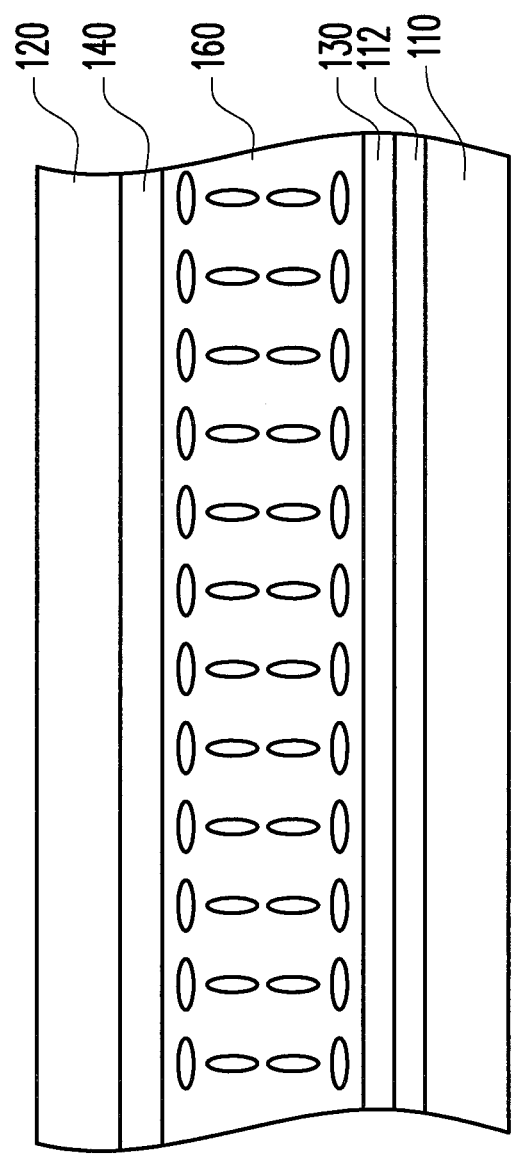
FIG. 8 is a schematic cross-sectional view of a touch display panel according to another embodiment of the present invention.

In addition, in the above-mentioned embodiments, as shown in FIG. 1A, the touch sensing layer 140 is disposed on the outer surface 120a of the second substrate 120, while according to another embodiment the touch sensing layer 140 may also be disposed between the second substrate 120 and the light shielding pattern layer 130 as shown in the touch display panel 100a of FIG. 6. Alternatively, according to another embodiment yet, as shown in FIG. 7, the touch display panel 100b further comprises an auxiliary substrate 170 disposed on the outer surface 120a of the second substrate 120, and the touch sensing layer 140 is disposed on the auxiliary substrate 170. In other word, the touch sensing layer 140 may be built in the display panel as shown in FIG. 1A, which is comprised of the first substrate 110, the second substrate 120 and the display medium 160 therebetween, or attached on the display panel as shown in FIG. 6 or FIG. 7. Furthermore, in the above-mentioned embodiments, the light shielding pattern layer 130 is disposed on the second substrate 120, while the light shielding pattern layer 130 may also be disposed on the first substrate 110. For instance, as shown in FIG. 8, in the touch display panel 100c of the embodiment, the light shielding pattern layer 130 is disposed on the substrate 110 and between the active layer 112 and the display medium 160. Moreover, in another embodiment (not shown), the light shielding pattern layer 130 may be formed by the data lines DL and the scan lines SL shown in FIG. 1B, or has other structure or arrangement on the first substrate 110 or the second substrate 120.

In the above-mentioned embodiments, the components and the arrangements of the touch display panel 100a, 100b and 100c are similar to those of the touch display panel 100 of the first embodiment, and are not described repeatedly. It is noted that, in the touch display panels 100a, 100b and 100c, the mesh touch pads of the touch sensing layer 140 may be the above-mentioned mesh touch pads 146-146d or other mesh touch pads based on the design of the present invention. In addition, since the mesh touch pads of the touch display panels 100a, 100b and 100c are formed by the above-mentioned grid patterns, the touch display panels 100a, 100b and 100c have better visual effect, good transmittance and good touch sensitivity.

To sum up, since the grid patterns of the mesh touch pad have a specific shape and a specific grid edge length, and a specific angle is between the bottom edge of the grid pattern and the pixel edge of the pixel unit, the interference between the mesh touch pad and the light shielding pattern layer is minimized, so as to resolve the problem of Moire effect and showing visual grid patterns. Moreover, the mesh touch pad is formed by grid patterns, and thereby the mesh touch pad has better transmittance, lower resistance and better sensitivity. Therefore, the touch display panel of the embodiments has better visual effect and good touch sensitivity.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A touch display panel, comprising:
   a first substrate having a plurality of pixel structures disposed thereon;
   a second substrate disposed opposite to the first substrate;
   a light shielding pattern layer, disposed on the first substrate or the second substrate, wherein a plurality of pixel units are defined by the light shielding pattern layer, each pixel unit has a pixel edge length, and each pixel unit is disposed corresponding to one of the pixel structures on the first substrate;
   a touch sensing layer, disposed on the second substrate and comprising a plurality of first touch series and a plurality of second touch series, each first touch series and each touch series respectively having a plurality of mesh touch pads serially connected to each other, each mesh touch pad having a plurality of grid patterns, wherein each grid pattern has a grid edge length, the grid edge length is ⅛~⅗ of the pixel edge length each grid pattern is twisting-cross-shaped, each twisting-cross-shaped grid pattern comprises four large quadrangles and one small quadrangle disposed in the center of the four large quadrangles, an angle between a bottom edge of each large quadrangle and a pixel edge of the pixel unit is 25~65°, and an angle between a bottom edge of the small quadrangle and the pixel edge of the pixel unit is 25~65°; and
   a display medium, sandwiched between the first substrate and the second substrate.

2. The touch display panel as claimed in claim 1, wherein the grid patterns have a line width in a range of 0.1~10 μm.

3. The touch display panel as claimed in claim 1, wherein the pixel edge length is 200 μm, the grid edge length of the large quadrangle is 5~50 μm, and a total grid edge length of the twisting-cross-shaped grid pattern is not more than 135 μm.

4. The touch panel as claimed in claim 1, wherein the touch sensing layer is disposed between the second substrate and the light shielding pattern layer.

5. The touch panel as claimed in claim 1, wherein the touch sensing layer is disposed on an outer surface of the second substrate.

6. The touch panel as claimed in claim 1, further comprising an auxiliary substrate disposed on an outer surface of the second substrate, and the touch sensing layer is disposed on the auxiliary substrate.

7. The substrate as claimed in claim 1, wherein a material of the light shielding pattern layer comprises a black resin.

8. The substrate as claimed in claim 1, wherein a material of the touch sensing layer comprises a metal.

9. The substrate as claimed in claim 8, wherein a material of the touch sensing layer comprises aluminum, copper, molybdenum, titanium, silver, gold, platinum or an alloy thereof.

* * * * *